S. L. FISHER.
EXPRESSION VALVE FOR PLAYER PIANOS.
APPLICATION FILED DEC. 24, 1917.
1,404,106.
Patented Jan. 17, 1922.
3 SHEETS—SHEET 3.
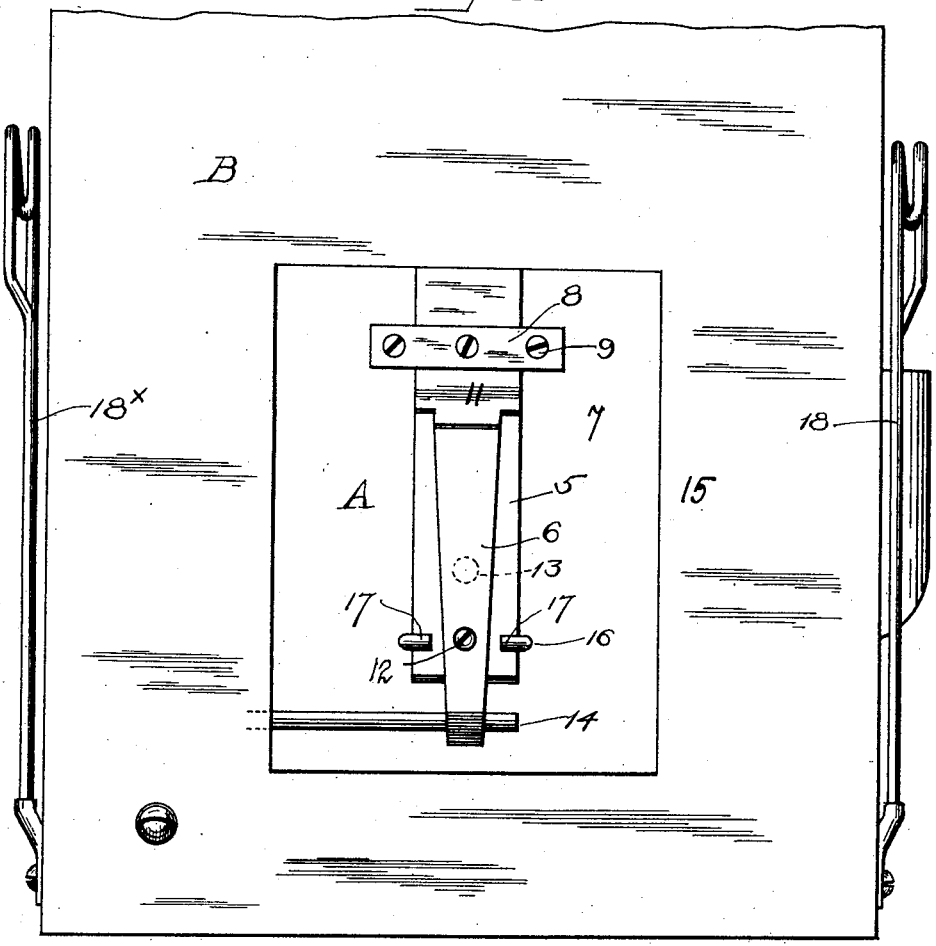
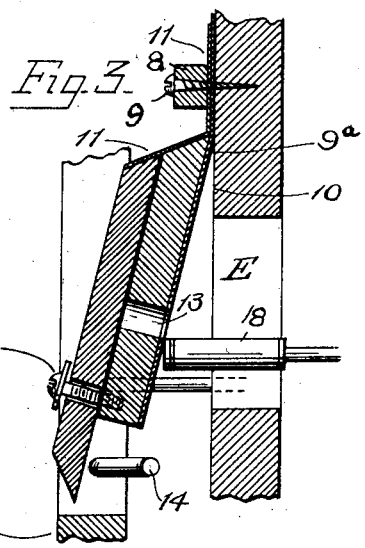

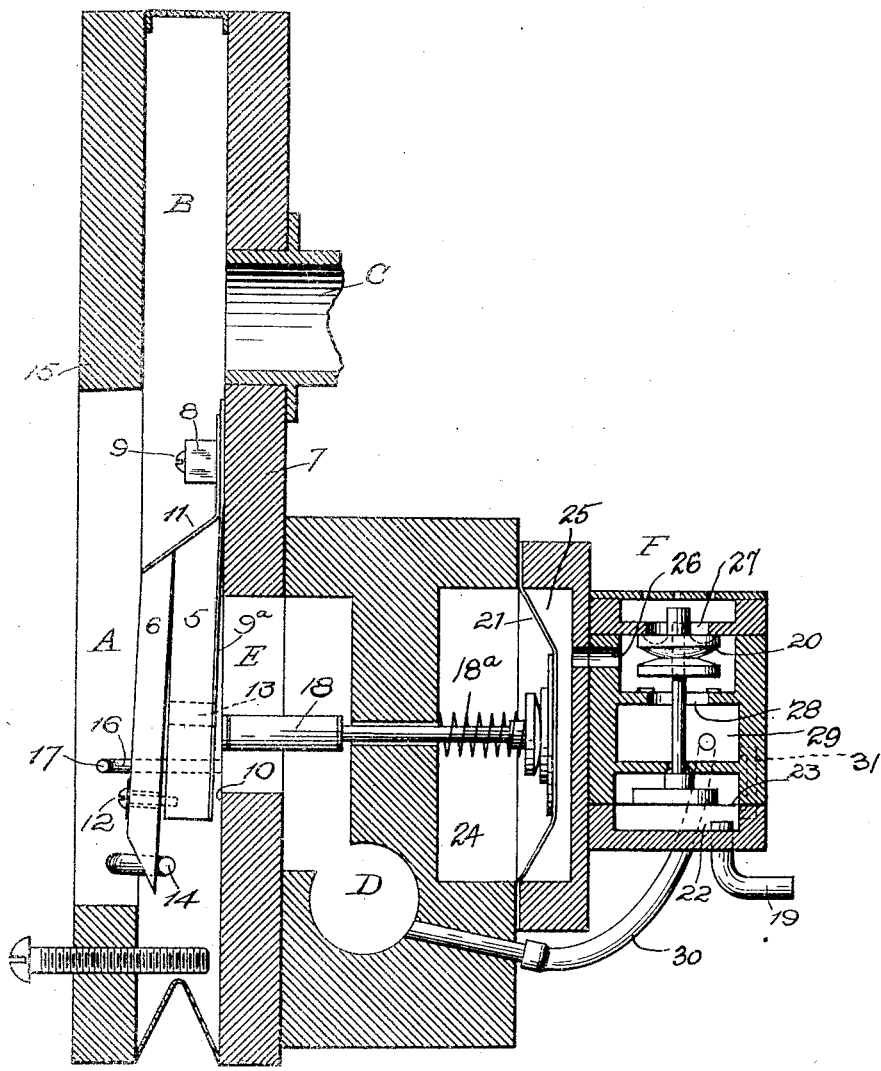

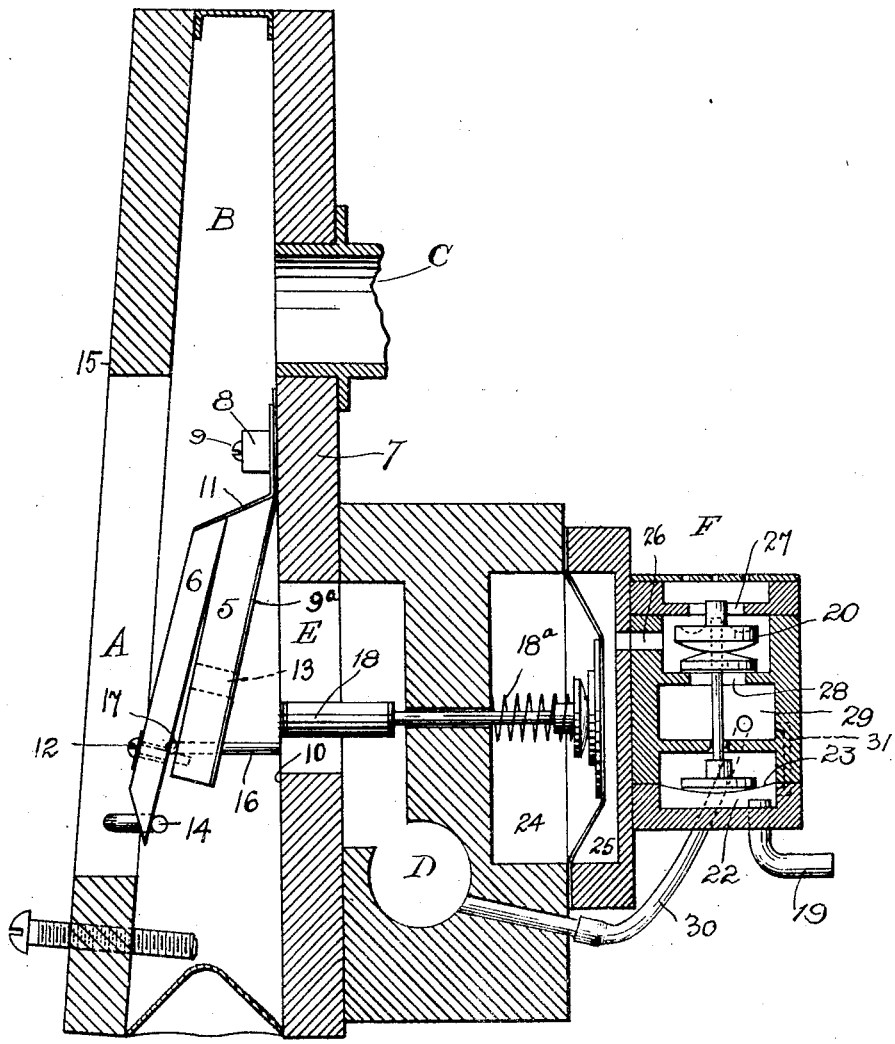

UNITED STATES PATENT OFFICE.

STANLEY L. FISHER, OF CHESTER, CONNECTICUT, ASSIGNOR TO THE PRATT READ PLAYER ACTION COMPANY, OF DEEP RIVER, CONNECTICUT, A CORPORATION OF CONNECTICUT.

EXPRESSION VALVE FOR PLAYER PIANOS.

1,404,106.  Specification of Letters Patent.  Patented Jan. 17, 1922.

Application filed December 24, 1917. Serial No. 208,628.

*To all whom it may concern:*

Be it known that I, STANLEY L. FISHER, a subject of the King of Great Britain, residing in Chester, county of Middlesex, State of Connecticut, have invented certain new and useful Improvements in Expression Valves for Player Pianos, of which the following is a full, clear, and exact description.

This invention relates to valve structures employed in player pianos and similar instruments, and it has particular reference to the construction of a flap valve which may be used, for example, in connection with an expression bellows or choker interposed between the action proper and the pumps for the purpose of controlling the force with which the strikers hit the keys, and, therefore, the expression of the instrument.

It has been heretofore proposed to use a flap valve for an expression valve controlling the communication between the action proper and the pumps, but valves of this kind have not generally worked in a satisfactory manner owing to the fact that the valve often sticks to such an extent under the influence of the suction that it is practically impossible to open the same. In other words, while the valve closes satisfactorily under the suction of the pumps, it is very difficult to overcome the suction or "pluck" which holds the valve seated, so that very often when conditions require the opening of the valve for proper operation of the piano, the same sticks and fails to open.

The primary object of my invention is to provide means for relieving the "pluck" in a device of this character, and more particularly it is aimed to provide a flap valve of such construction that it may be readily opened, thereby obviating the disadvantages above mentioned. By my invention a hinged valve or a so-called flap valve may be satisfactorily used as an expression valve for controlling the passage of air through the expression bellows from the action to the pump or pumps, but I do not limit myself in all aspects of the invention to a valve used for this specific purpose, as variations of construction and use may be made without departing from the scope of the invention.

With the foregoing and other ends in view, the invention consists in the novel features and combinations of parts to be hereinafter described and claimed.

In the accompanying drawings:

Fig. 1 is a vertical, longitudinal section of an expression bellows of a player piano, having a controlling flap valve embodying my invention, showing the parts in position for playing softly;

Fig. 1$^A$ is a similar view, showing the position of the parts when there is no suction in the instrument;

Fig. 2 is an elevation of the bellows partly broken away and with a part of the lid or movable leaf omitted to show the interior valve construction; and Fig. 3 is a vertical section of certain parts showing the valve in the accenting position.

In the drawings, I have shown by improvements applied to a flap valve denoted generally by reference character A, associated with the expression bellows B of a player piano. The bellows B, which has the usual springs 18$^\times$ normally holding it expanded, is provided with a connection C to the player action proper, i. e. the wind chest and striker pneumatics, and also has a connection D leading to the pump or pumps. In passing from C to D, the air sucked from the action proper passes into and through the interior of bellows B and out of an opening E in the base or fixed part of the bellows. The valve A controls this opening E, and when partially closed tends to shut off communication between the action and the pump or pumps, thereby diminishing the suction or tension in the action; on the other hand, when the valve A is given an opening movement, the communication between the action and pumps is enlarged so that the striking action is in more direct and free communication with the pumps.

The valve A is, in accordance with my invention, made of at least two relatively movable parts. In the example shown, it is composed of a larger or main part or member 5 and a smaller or subsidiary part or member 6, the member 5 serving as a base or main flap and the part 6 serving as an auxiliary flap superposed thereon. In the particular form shown, both the main and the auxiliary flaps are hinged to the base or fixed board 7 of the bellows by means of a cleat 8 secured to the board 7 by screws 9. Fastened beneath the cleat is a layer of leather 9$^a$ which is glued to the under or seating surface of the main flap 5 and is adapted to seat on the seat 10 around the port E. The piece 9ª, of leather or other flexible material, also serves to hinge the main flap of the valve, as will be understood. A piece 11, of fabric or the like, is also clamped in place beneath the cleat 8 on top of the leather piece 9ª, and at its lower portion is glued to the upper portions of the main and auxiliary flaps 5, 6 respectively. The piece of fabric 11 extends down over and is glued to a chamfered or bevelled surface at the upper end of the main flap, and is thence continued down over a chamfered or bevelled surface at the top of the auxiliary flap. It serves, therefore, as an additional means for hinging the main flap to the base board 7, and, in addition, it serves as a means for hinging the auxiliary flap to the main flap at the upper portions of said flaps. The auxiliary flap has a limited swinging movement on the hinge thus provided, so that at the lower portion of the valve structure the auxiliary flap may be raised to a certain extent from the main flap. The stop provided for limiting the relative movement of the two flaps may consist of a small screw 12 screwed into the lower front part of the main flap 5 through a clearance opening in the lower part of the auxiliary flap, the head of said screw being sufficiently large, however, to form a stop for the auxiliary flap. This stop may obviously be adjusted as desired by screwing it in or out relatively to the main flap. The main flap is provided at a point which is located over port E (when said flap is in the semi-closed position) with a port 13 leading therethrough and adapted to communicate with the space which is created between the two flaps. In the example shown, the outer or auxiliary flap extends downward beyond the lower edge of the main flap into cooperation with an actuating rod 14 fixed to the movable leaf 15 of the bellows B, and extending back of the lower end portion of the auxiliary flap.

In the example shown, I have provided a common means for limiting movement of the main flap away from its seat and for limiting the opening movement of the bellows. This means consists of a pair of pins 16 secured to the base board 7 at opposite side edges of the main flap 5, and having inturned outer ends 17 overlying the main flap so as to limit the movement thereof. By limiting the swinging movement of the main flap, the movement of the bellows lid or movable leaf is also restricted owing to the engagement of the rod 14 behind the lower part of the auxiliary flap 6.

The flap valve structure A serves, in effect, as an automatic regulator for preventing sudden changes in the tension of the wind chest under normal conditions, that is to say, when such changes are not desired. It provides for a softened and governed tension when the expression controlling device hereinafter described is suitably manipulated. Thus, when a considerable degree of suction is suddenly exerted by working of the pump or pumps, the bellows is collapsed and the valve A is almost closed, thus preventing the sudden suction increase in the pumps from being directly communicated to the wind chest. On the other hand, when the pumping is very light, the bellows will expand and the valve A will be opened thereby as far as is permitted by the stop pins 16, and more direct communication between the wind chest and the pump or pumps will be established, tending to maintain the existing tension in the wind chest. When the flap valve is almost closed, the main flap 5 almost seats on the surface 10 around the port E, and the auxiliary flap, in turn, almost seats on the body of the main flap and over the port 13, there being a slight air leakage around both of the flaps. As the suction decreases beyond a predetermined limit, the springs $18^x$ come into play and the movable lid of the bellows, acting through the rod 14, first pulls up the auxiliary flap, thus permitting more air to pass under the auxiliary flap and through port 13 in the direction of the pumps, thereby tending to equalize the pressure at opposite faces of the main flap and relieving the "pluck" on the under surface of said flap. This "pluck" being relieved to a certain extent, the main flap is easily pulled open through its connection with the auxiliary flap. By this construction, the sticking of the valve is entirely overcome, and the same may be made to operate very efficiently and satisfactorily.

In the particular form shown, I have illustrated a sliding expression plunger 18 controlled from a push button device, for example, or from the note sheet, for changing the expression by extraneous control of the flap valve A. The plunger 18 is adapted to impinge on the rear or under surface of the main flap 5 and may be used for opening the flap valve structure suddenly when it is desired to accent a note or notes, as shown in Fig. 3. In the example shown, the plunger 18 is adapted to be actuated by a diaphragm 21 interposed between the base structure of the bellows and a primary valve structure F embodying a double valve 20, which may be controlled by a push button, (not shown) connected with a tube 19 leading to a chamber 22 beneath a pouch 23 which is adapted to shift the double valve 20. The space 24 at the left of diaphragm 21 is in communication with the pumps, and the space 25 at the right of said diaphragm is adapted to communicate with the atmosphere by way of a duct 26 and a port 27, said port being controlled by the upper portion of the double valve 20. When the valve 20 is raised by elevation of the pouch 23 in a manner well understood in the art, its upper portion closes the port 27 and simultaneously its lower portion uncovers a port 28 leading from the valve chamber to a suction chamber 29, that is in turn connected with the pumps by a tube 30. Under these conditions, the space 25 at the right of the diaphragm 21 is exhausted, and a spring 18ª moves the plunger 18 to the position shown in Fig. 1, where it has no effect on the flap valve structure 5, 6. Under these conditions, the flap valve provides for a softened and governed tension, as previously described. When, however, it is desired to accent a note or notes, the communication of the tube 19 with the atmosphere is cut off in a well known manner, and the primary valve 20 is consequently lowered to the position shown in Fig. 1ª, air being sucked out of the chamber 22 into the chamber 29 through a bleed 31, and thence toward the pumps by way of the tube 30. The primary valve being lowered, the space 25 is placed in communication with the atmosphere, the pressure of which shifts the diaphragm 21 to the left and with it the plunger 18, thus suddenly opening the flap valve structure to a considerable extent, as shown in Fig. 3. This permits a very full and direct communication between the action and the pumps by way of the port E, and as a consequence the note or notes in question are strongly accented. The accenting effect is, of course, produced by a sudden and complete opening of the flap valve structure by impingement of the plunger 18 against the under surface thereof, at a time when the tension is considerably reduced by the almost complete collapsing of the expression bellows, and the almost complete closing of the interior expression valve controlled thereby.

Various modifications of the construction described may be made without departing from the scope of my invention as defined in the claims.

What I claim is:

1. The combination of means presenting a port, a hinged flap controlling said port and having an opening therethrough, a second flap hinged to the first and having a limited swinging movement relatively thereto for controlling said opening, and means engaging only one of said flaps for lifting both flaps.

2. The combination of means presenting a port, a flap valve structure controlling said port comprising an under flap with an opening therethrough, and a loosely mounted outer flap controlling said opening, and means for operating both flaps of said valve by action on the outer flap.

3. In a player piano, the combination of an expression bellows interposed between the action and the pump and having a port, a main flap controlling said port having an opening therethrough, and a subsidiary flap controlling said opening and connected with said first flap and with the movable part of said bellows.

4. In a player piano, the combination of an expression bellows interposed between the action and the pump and having a port, a flap for controlling said port having an opening therethrough, a second flap hinged to the first and for controlling said opening, means for limiting the movement of the second flap away from the first, and means for operating said second flap from the movable part of the bellows.

5. In a multiple valve structure, the combination of a valve seat, a plurality of flaps controlling the same, and a common means for hinging the flaps.

6. In a multiple valve structure, the combination of a supporting member, a port therein, a valve for cooperation with said port including a primary flap, a secondary or auxiliary flap, and a single piece of material secured to said supporting member and having one portion applied to said primary flap for hinging it to said member, and another portion extending over onto and secured to the auxiliary flap for hinging it to the primary flap.

7. In a player piano, the combination of an expression bellows having a port, a multiple flap valve structure for controlling said port, embodying a hinged main flap, and an auxiliary hinged flap operated by the movable part of said bellows and loosely connected with the main flap, and means on said auxiliary flap cooperating with the main flap to control the position thereof and thereby vary the expression.

8. In a multiple valve structure such as described, the combination of a supporting member having a port, a main flap hinged to said member for controlling said port and having an opening therethrough, an auxiliary flap hinged to the main flap for controlling said opening, means for limiting the movement of the second flap relatively to the main flap, means for operating the valve by lifting the second flap, and means for limiting the opening movement of the main flap.

9. In a player piano, the combination of an expression bellows having a port, a primary valve member controlling said port and having an opening therethrough, a secondary valve member for controlling said opening, having a lost motion connection with said first valve member, means for operating the whole valve structure by acting on the second valve member, and means for limiting the opening movement of the first valve member.

10. In a player piano, the combination of an expression bellows having a port, a primary valve member controlling said port and having an opening therethrough, a secondary valve member for controlling said opening, having a lost motion connection with said first valve member, means for operating the valve structure by moving the second valve member, means for limiting the opening movement of the first valve member, and adjustable means for varying the amount of lost motion between said valve members.

11. The combination of means presenting a port, a valve having inner and outer relatively movable members, both controlling said port, means of lost motion connection between said valve members, means for exerting suction on said valve through said port, and means for engaging the outer valve member to lift the whole valve structure.

12. The combination of means presenting a port, a valve having relatively movable members controlling said port, means of lost motion connection between said members, means for exerting suction on said valve through said port, a bellows in which said valve is located, and means for lifting the whole valve structure by the inflation of said bellows.

13. The combination of means presenting a port, a valve having relatively movable members controlling said port, means of lost motion connection between said members, means for exerting suction on said valve through said port, a bellows in which said valve is located, and means for lifting the whole valve structure by the inflation of said bellows, comprising a connecting means between the movable bellows leaf and one of the valve members.

14. The combination of means presenting a port, a valve having relatively movable members controlling said port, means of lost motion connection between said members, means for exerting suction on said valve through said port, a bellows in which said valve is located, and means for lifting the whole valve structure by the inflation of said bellows, comprising a connecting means between the movable leaf of the bellows and that valve member which is outermost relatively to said port.

15. In a player piano, an expression bellows having a port, a flap within the bellows controlling said port, a second flap within the bellows superposed on the first flap, also controlling said port, variable means of connection between said flaps providing for a certain amount of lost motion between the same, and means for connecting the second flap with the movable part of the bellows so that it is actuated thereby to raise both flaps when the bellows is inflated.

16. In a player piano, an expression bellows having a port, a ported valve member controlling said port, a second superposed valve member controlling the port of the first valve member, means of lost motion connection between said valve members, a connecting means between the movable leaf of the bellows and the second valve member whereby the whole valve structure is lifted by the inflation of said bellows, and means engageable with the first valve member for pushing the valve structure open from the opposite side.

17. In a player piano, a bellows having a fixed part with a port therein, a hinged valve member for controlling said port, having an opening extending therethrough, a second hinged valve member for controlling the opening in the first, means of lost motion connection between said valve members, means for lifting the whole valve structure by engagement with the second valve member, said last named means mounted on the movable leaf of said bellows, and means for limiting the opening movement of the first valve member and thereby limiting the inflation of said bellows.

18. In a player piano, means presenting a port, a valve having superposed members for controlling said port directly, adjustable means providing a variable amount of lost motion between said valve members, means for exerting suction on said valve through said port, and means for lifting the whole valve structure by engaging the valve member which is located outermost relatively to said port.

19. A regulator including a regulating pneumatic and a governing valve controlled thereby, said valve comprising two parts hinged together, said pneumatic operatively moving both parts of said valve but connected to one only thereof.

20. A regulator comprising a regulating pneumatic and a governing valve mounted within the same, and controlled thereby, said valve consisting of two loosely connected parts, and said pneumatic being connected to one only of said parts but causing an operative movement of both thereof.

21. A regulating device including a pneumatic, a valve controlled thereby comprising two hingedly connected parts, means connecting one of said parts to the pneumatic to be moved thereby, and an additional connection between said parts whereby motion imparted to one thereof by the pneumatic is transmitted to the other.

In witness whereof, I have hereunto set my hand on the 19 day of December, 1917.

STANLEY L. FISHER.